United States Patent [19]

Pollitt

[11] 3,709,033

[45] Jan. 9, 1973

[54] VELOCITY MONITOR FOR AIRCRAFT
[75] Inventor: James Pollitt, Bristol, England
[73] Assignee: Rolls-Royce Limited, Derby, England
[22] Filed: Oct. 19, 1970
[21] Appl. No.: 82,052

[30] Foreign Application Priority Data

Oct. 21, 1969 Great Britain.....................51,510/69

[52] U.S. Cl. ..............................................73/178 T
[51] Int. Cl. ..........................................G01c 21/10
[58] Field of Search..................73/178 T, 178 R, 490

[56] References Cited

UNITED STATES PATENTS 3,034,096   5/1962   Craddock ..........................73/178 T
3,077,110   2/1963   Gold ...................................73/178 T Primary Examiner—Donald O. Woodiel
Attorney—Stevens, Davis, Miller & Mosher

[57] ABSTRACT

This invention pertains to a velocity monitor for an aircraft wherein a signal is given if, during the ground-roll of a take-off, the actual velocity falls below that necessary for successful take-off. To this end there is provided in series connection an accelerometer, a first and a second integrator, a function generator and a comparator for the first integral being a signal of actual velocity and the output of the function generator being a signal of desired velocity. The output of the comparator shows whether actual velocity is above or below the desired velocity.

4 Claims, 2 Drawing Figures

VELOCITY MONITOR FOR AIRCRAFT

This invention relates to a velocity monitor for aircraft.

It is an object of this invention to provide apparatus whereby it is possible, at the beginning or during the ground-roll of a take-off, to determine whether the velocity necessary for becoming airborne can be attained within a given distance along the runway.

According to this invention there is provided apparatus for monitoring the velocity of an aircraft, comprising means capable of cooperating with the aircraft for producing a first velocity signal indicative of the actual velocity of the aircraft, means capable of cooperating with the aircraft for producing a signal indicative of the distance travelled by the aircraft, means for deriving a second velocity signal being a pre-determined function of the distance signal, means for varying the mean slope of said function to produce a modified function signal, and means for comparing the first velocity signal and the modified function signal to produce an output indicative of the relative superiority of the compared signals.

Said function is a pre-determined basic relationship between velocity and distance travelled if the aircraft is to be able to complete a standard take-off. Said means for varying the mean slope of the function make it possible to allow for changing parameters such as aircraft load or available length of runway.

Preferably said mean slope is determined as a function of the initial acceleration necessary for a safe take-off, and to this end the apparatus may comprise an accelerometer, an instrument for the display of acceleration including two independently moveable indicators, means for driving one of the indicators in response to the output of the accelerometer, and means for setting the other indicator connected to said means for varying the slope of said function for the latter slope to be variable in response to actuation of the setting means.

An example of apparatus according to this invention, as applied to an aircraft take-off maneuver, will now be described with reference to the accompanying drawings wherein.

Figure 1:
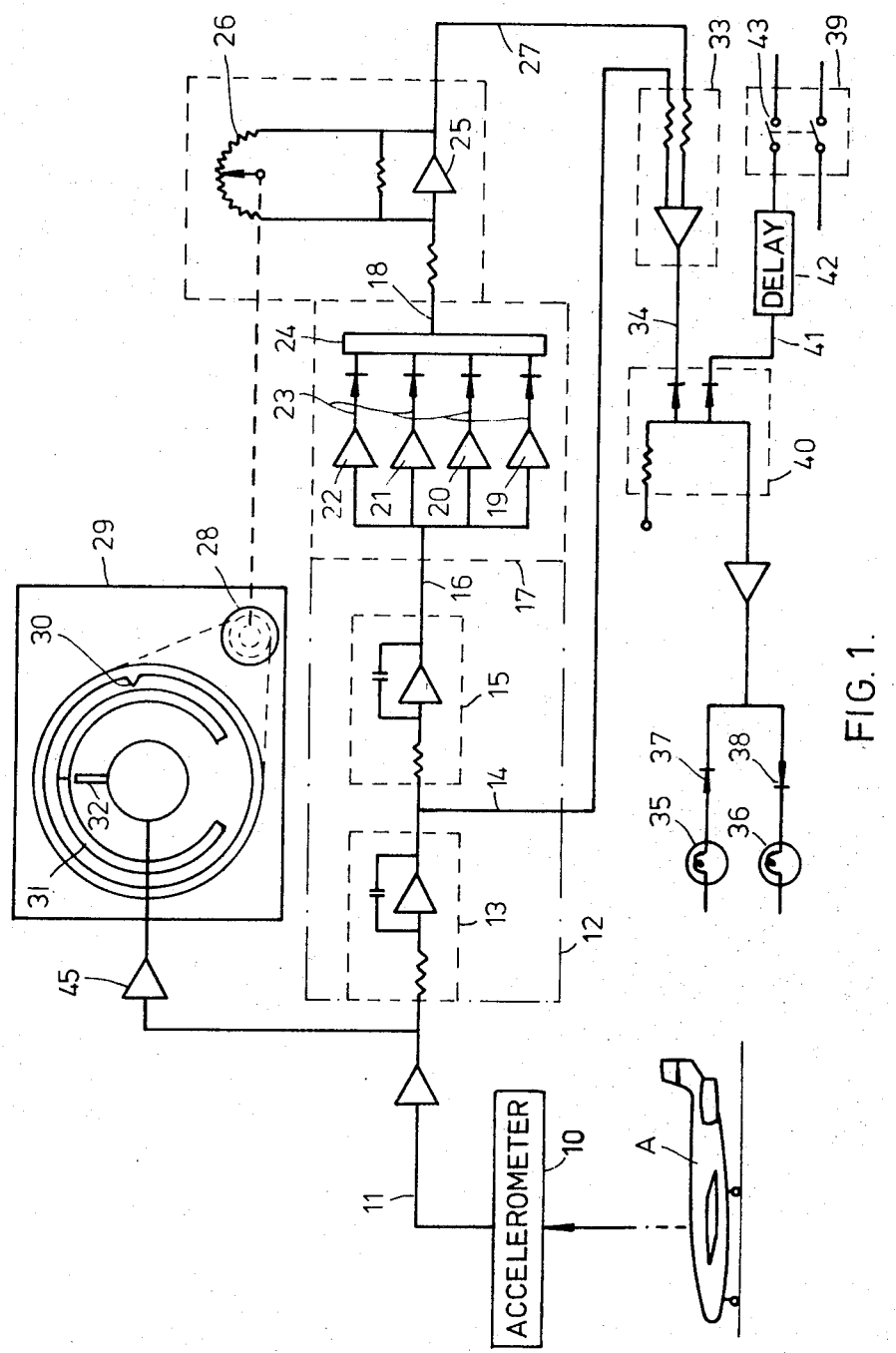
FIG. 1 is a diagram of an electrical circuit of the apparatus.

Referring to the drawings, there is shown an accelerometer 10 known per se and having an electrical output 11 in terms of millivolts/unit of acceleration. The accelerometer is installed in an aircraft A to sense the acceleration thereof. The signal 11 is connected to an electrical analogue computer 12 in which this signal is connected to a first integrator 13 to produce an output 14 being at any one time the velocity attained by the aircraft in consequence of the acceleration. The signal 14 is connected to a second integrator 15 to produce an output 16 being at any one time the distance travelled by the aircraft in consequence of the acceleration. The signal 16 is connected to a function generator 17 adapted to produce a signal 18 defining a velocity which the aircraft would attain at any given distance travelled during a typical take-off.

The signal 18 is also referred to as the "basic take-off law." This law, which depends on such substantially constant factors as engine behavior and aircraft aerodynamics, is originally determined experimentally by performing a typical take-off mission at full engine power with a standard load and under as near standard atmospheric conditions as possible. Minor adjustments are then made by calculation, to establish the law as it would be on a "standard" day. The function generator 17 is then constructed to reproduce this basic take-off law in the form of the signal 18.

Figure 2:
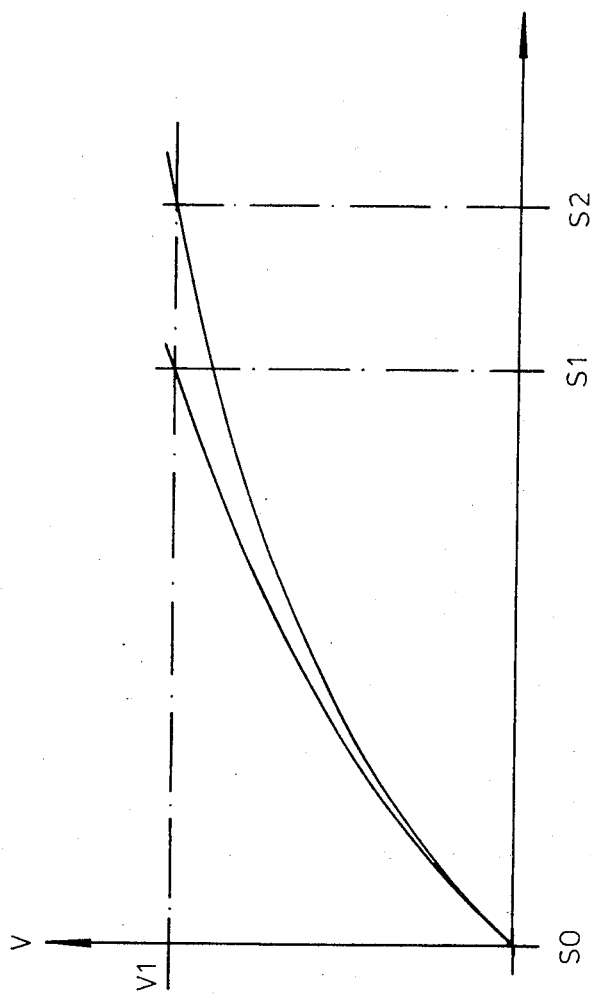
FIG. 2 is a set of curves showing different velocity/distance relationships in respect to an aircraft take-off.

FIG. 2 shows the law 18 as plotted between the start of the take-off run, signified by SO, and a distance S1 at which the aircraft has attained a velocity V1 at which the take-off can be completed safely. If the velocity V1 is not attained at position S1 then the take-off must be abandoned. The distance S1 allows for sufficient runway to be available for the aircraft to be halted safely if the take-off is abandoned.

The function generator 17 comprises a plurality of amplifiers 19 to 22 having progressively higher threshold voltages so that as the distance signal 16 rises from zero to S1 the amplifiers are sequentially brought into use. The gains of the successive amplifiers are adjusted so that their outputs 23 define successive portions of the law 18. The outputs 23 are fed to a highest gain unit 24 which allows only the highest of the signals to pass, and the output of the unit 24 constitutes the law 18. The gains of the amplifiers 19 to 22 are linear and it is assumed herein that the law 18 can be represented by a succession of linear functions.

The means slope of the law 18 varies with certain environmental parameters, for example the length of the runway. Thus, if a longer runway is available the distance necessary to attain V1 may be increased. Assuming full power is used again, the longer runway will permit an increase in take-off weight but at reduced acceleration. Generally, the mean slope of the law 18 is a function of the acceleration required to carry out a particular take-off mission.

It has been found that said mean slope is in fact determined, at least to a good approximation, by the acceleration required at the commencement of the take-off run. This initial acceleration can be calculated or taken from charts.

To change the slope of the signal 18 in accordance with said initial acceleration, the signal 18 is fed to an amplifier 25 provided with a potentiometer 26 connected to vary the gain of this amplifier. The output, denoted 27, of the amplifier 25 is therefore proportional to the law 18 but at a mean slope depending on the setting of the potentiometer 26. The signal 27 is also referred to as "the modified law."

The potentiometer 26 is settable by means of a knob 28 provided on a dial instrument 29 embodying a marker or indicator 30 connected to be rotated by the knob 28 relative to a scale 31. The instrument 29 includes an indicator 32 adapted to be driven relative to the scale 31 by the signal 11 for direct display of acceleration. Means for driving an indicator such as 32 from an electrical signal are sufficiently indicated by an amplifier 45 as such means are well known per se.

It will be seen from FIG. 2 that, for constant maximum velocity, the mean slope of the function is proportional to the distance travelled and proportional to the initial acceleration. There is, therefore, no incompatibility between a reading of acceleration being used for setting said slope.

The purpose of producing the modified law 27 is to make it possible to monitor the ground roll to see whether actual velocity matches that required by the law 27. To this end the velocity signal 14 and the signal 27 are fed to a comparator network 33 adapted to produce a signal 34 whose sign changes with the sign of the sum of the two signals 14, 27. The signal 34 is fed to a pair of lamps 35,36 through diodes 37,38 such that the lamp 35 lights when the signal 14 is greater than the signal 27 to indicate that take-off can proceed normally, or that the lamp 36 light to indicate that actual velocity is below the safe limit set by the law 27 in the latter case the pilot will abandon the take-off.

The action defining the commencement of the ground roll is usually the release of the ground wheel brakes of the aircraft. This is actuated by means of a switch 39. During the first moments of the ground roll the accelerometer reading may be inaccurate due to possible pitching of the aircraft following the release of the brakes. To prevent the lamp 36 lighting under these circumstances the signal 34 is led through an AND-gate 40 together with a signal 41 being the output of a delay unit 42 whose action is initiated by a set of contacts 43 of the switch 39. Thus when the switch 39 is operated the lamps 35,36 are disconnected until the delay unit produces its output. During this delay period the pointer 32 provides an instant indication of whether actual acceleration meets that set by the marker 30. First, quite apart from said delay, the pilot can see directly from the dial 29, and independently of the computer 12 whether the take-off is likely to succeed, and during the remainder of the take-off the lamps 35,36 will indicate to the pilot whether the success condition is being maintained.

The use of acceleration as the parameter determining the slope of the basic law is of particular advantage because this is directly representative of the aircraft performance required for the mission. It would, for example, not be as useful to take engine power as the determining parameter although the power is proportional to acceleration. The reason is that even if engine power can be measured accurately, and this can be difficult, it would still be possible to get unrealistic results because power could be exerted without necessarily affecting velocity as in the case of faulty brakes or slush on the runway or any other unpredicted condition of resistance to movement.

In the foregoing description it has been assumed that the take-off mission will be carried out at full power and that the modified law is indicative of the performance which has to be achieved using full power. As a result, when take-off conditions are not limiting, e.g., at light weights or ample length of runway, full power is used unnecessarily.

To avoid this, the acceleration value fed to the computer may be that corresponding to the least power which is safely required for take-off. This required minimum acceleration is also calculated or taken from charts, but including a margin of safety. The pilot will set the engine to a given power setting, usually in terms of engine speed or overall engine pressure ratio in the case of jet engines, or torque in the case of a propellor power plant, and will monitor his instruments to maintain that power setting. The power requirement can, of course, be fed into an automatic closed loop control system to maintain power automatically.

The visual display by the lamps 35,36 may have means to display the legends "GO" and "STOP" depending on whether the actual velocity is above or below the safe one.

The system may include an air speed sensor (not shown) connected adjacent the lamps 35,36 so that when a certain preselected airspeed, that is the velocity V1, is attained, the legend "V1" appears on the display to the exclusion of the legends "GO" and "STOP." The pilot will then know that he can end the actual take-off run or ground roll and lift the aircraft off the runway.

We claim:

1. Apparatus for monitoring the velocity of an aircraft comprising means capable of cooperating with the aircraft for producing a first velocity signal indicative of the actual velocity of the vehicle, means capable of cooperating with the vehicle for producing a signal indicative of the distance travelled by the vehicle, means for deriving a second velocity signal which is a predetermined function of the distance signal and has a mean slope, means for varying the mean slope of said function to produce a modified function signal, means for comparing the first velocity signal and the modified function signal to produce an output indicative of the relative superiority of the compared signals, an accelerometer, an instrument for the display of acceleration including two independently movable indicators, means for driving one of the indicators in response to the output of the accelerometer, and means for setting the other indicator connected to said means for varying the mean slope of said function to make the latter indicator variable in response to actuation of the setting means.

2. Apparatus for monitoring the velocity of an aircraft comprising in series connection an accelerometer, a first integrator, a second integrator, a function generator for generating a predetermined function having a means slope, and manually operable means for varying the mean slope of the output of the function generator; and further comprising a comparator having as its inputs the output of the first integrator and the output of the manually operable means, a display means connected to the comparator for showing whichever of the two comparator inputs is the greater, a display means for the output of the accelerometer, a scale of acceleration included in the latter means, and the manual means being arranged to be settable against said scale.

3. Apparatus for monitoring the velocity of an aircraft during ground roll comprising first integrating means capable of cooperating with an accelerometer in said aircraft for producing a first velocity signal corresponding to the actual instantaneous velocity of the aircraft; second integrating means coupled to the output of said first integrating means for producing a signal corresponding to the actual instantaneous distance travelled by said aircraft during ground roll; function generator means having its input coupled only to the output of said second integrating means for producing a second velocity signal which is a predetermined increasing function of the actual instantaneous distance travelled by said aircraft, said predetermined function having a mean positive slope; means for varying the mean slope of said predetermined function as an approximate function of the acceleration required at the commencement of the take-off run to produce a modified function signal corresponding to the desired velocity of said aircraft; and means for comparing the first velocity signal and the modified function signal to produce an output indicative of the actual instantaneous velocity of the aircraft as compared to the desired velocity.

4. The method of monitoring the velocity of an aircraft during ground-roll prior to take-off comprising the steps of a. determining the initial acceleration required at the commencement of the ground-roll to attain said take-off velocity and setting a function modifier in accordance with said initial acceleration, b. determining the actual instantaneous acceleration of said aircraft during ground-roll, c. displaying the initial acceleration required at the commencement of ground-roll to attain safe take-off velocity and the actual instantaneous acceleration of said aircraft, d. determining the actual instantaneous velocity of said aircraft during ground-roll, e. determining at each instant the distance travelled by said aircraft during ground-roll, f. generating a predetermined velocity function varying substantially with the distance travelled during ground-roll by said aircraft, said predetermined velocity function having a mean slope, g. modifying the mean slope of said predetermined velocity function in accordance with said initial acceleration required for a safe take-off to produce a modified velocity function, h. comparing the instantaneous velocity of said aircraft with said modified velocity function, and i. indicating whether the instantaneous velocity is less than the modified velocity function, as instantaneous velocity less than the modified velocity function being unsafe for take-off.

* * * * *